United States Patent [19]
Strickland

[11] 3,801,920
[45] Apr. 2, 1974

[54] A. C. CONTROL CIRCUIT
[75] Inventor: James C. Strickland, North Miami Beach, Fla.
[73] Assignee: MCI Inc., Ft. Lauderdale, Fla.
[22] Filed: Oct. 16, 1972
[21] Appl. No.: 298,046

[52] U.S. Cl. .................................. 330/10, 330/109
[51] Int. Cl. .............................................. H03f 3/38
[58] Field of Search ............ 330/109, 10, 261, 262, 330/268; 328/21, 162, 164

[56] References Cited
UNITED STATES PATENTS

| | | | |
|---|---|---|---|
| 3,626,304 | 12/1971 | Wallen | 330/10 X |
| 3,602,833 | 8/1971 | Barhette | 330/109 X |
| 2,924,782 | 2/1960 | Zomber | 330/109 |

Primary Examiner—Nathan Kaufman
Attorney, Agent, or Firm—A. Yates Dowell, Jr.

[57] ABSTRACT

An a.c. control circuit comprising circuitry connected to receive a d. c. program reference control voltage, as from a speed, tension, or torque voltage-responsive source, and which may include a suitable d.c. amplifier connected to provide the d.c. input to a suitable chopper having a chopping drive signal circuit connected to a main a.c. power source to provide a square wave chopper output having a peak-to-peak amplitude responive to the programmed d.c. input voltage and a frequency equal to and 180° out of phase with the main a.c. power source frequency. This programmed square wave control signal is coupled to an active filter which may comprise an operational amplifier having a negative feedback with a sharply tuned filter therein, such as a sharp twin-T notch filter tuned sharply to the frequency of the main a.c. power source, whereby a stable and drift-free sine wave output control voltage is provided having a frequency synchronous and in phase with the main a.c. power source frequency and a peak-to-peak amplitude directly responsive to the chopper square wave output amplifier. The controlled a.c. power is supplied through a full-wave rectifier such as an unfiltered full-wave bridge rectifier, having inputs connected across the main a.c. power source and outputs connected to emitter-follower power inputs of an emitter-follower amplifier. The programmed control is provided by coupling the active filter output through a suitable transformer to a base drive circuit of the emitter-follower amplifier, whereby the latter has a power output voltage having a wave form corresponding substantially to the programmed drive control voltage from the active filter, free from line voltage fluctuations or variable circuit-component effects.

8 Claims, 1 Drawing Figure

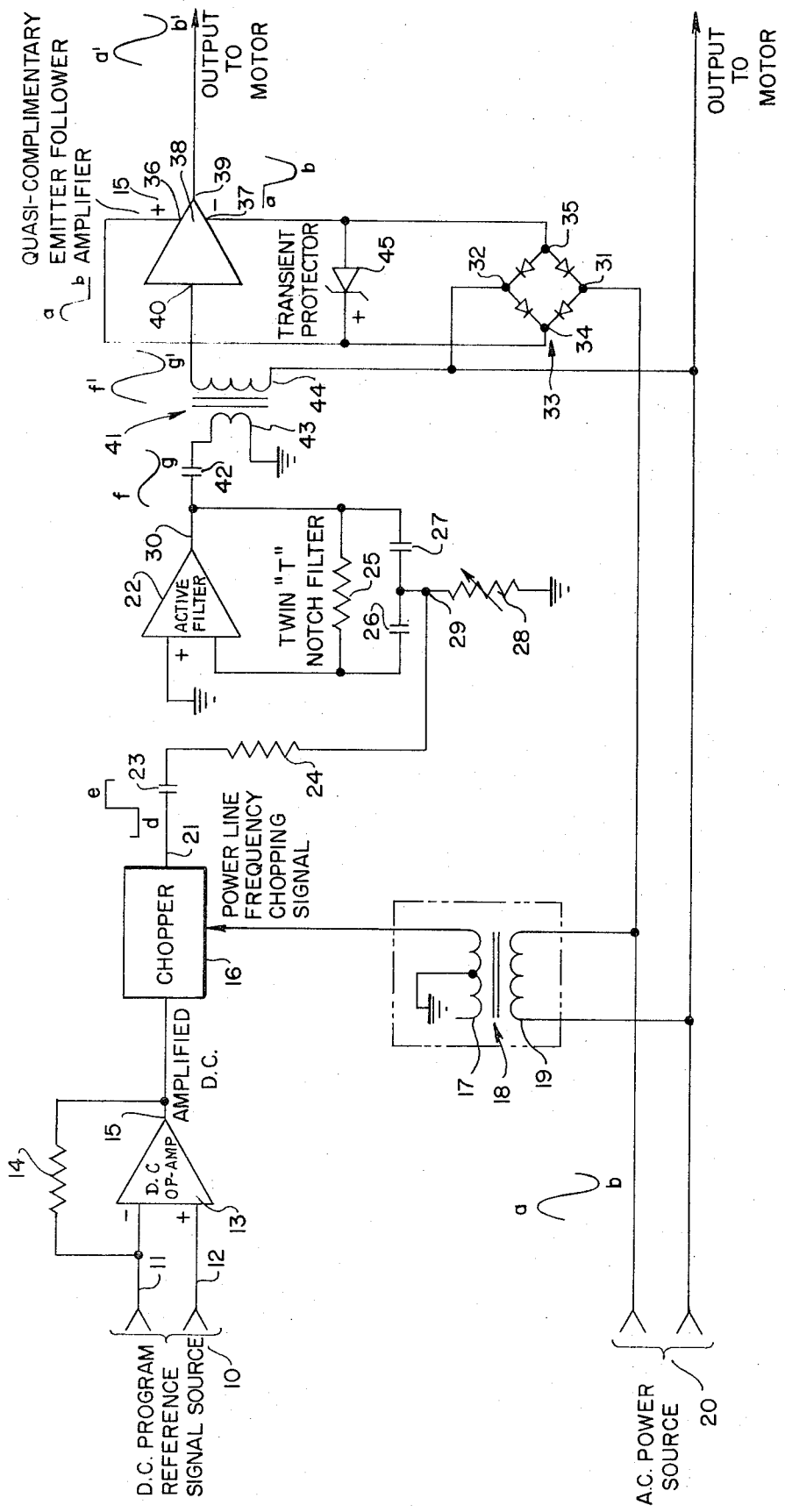

A. C. CONTROL CIRCUIT

FIELD OF THE INVENTION

This invention pertains to a.c. control circuits and particularly to a.c. control circuits which are responsive to a desired programmed reference, such as tension, speed, torque, or some other predetermined variable or constant property, and which are highly stable and drift-free and immune to power line fluctuations so as to assure true response to the program without extraneous interferences. Such a.c. control is especially important where fidelity in reproduction is required, as in the torque of spooling motors for magnetic tape and film recording devices.

BACKGROUND OF THE INVENTION

Many motorized drive applications require predetermined operating characteristics obtainable by a programmed control, such as those used for magnetic tape and film recording which require a predeterminable control of the torque of the spooling motors. Alternating current motors provide many advantages in smoothness and reliability of operation, long life, and freedom from brush-generated electromagnetic interference.

Various types of a.c. motor controls have been used, but each has had some undesirable features. For example, phase-angle control employing SCR circuits produce non-sinusoidal waveforms which are difficult to reconvert to sine waves at high power levels, thereby distorting the recording wave form. Also, the abrupt switching of these devices creates electromagnetic interference which is virtually impossible to filter out of sensitive audio equipment. Saturable reactors have been used to minimize the effect of line fluctuations on the operation of the motors, but these also involve bad waveform, radiate magnetic fields, are bulky, and often have a limited control range. Both of these also allow line voltage fluctuations to appear in the motor drive circuit with resultant variations in the motor torque.

Straight amplifier drive of motors involves high power dissipation in semiconductor units, transistors with voltage ratings in excess of the peak-to-peak output waveform, and require large filter capacitors to provide the high powered d.c. necessary for the amplifier supply.

Patents which appear to illustrate the state of the art are Palthe U.S. Pat. No. 3,125,694, O'Brien U.S. Pat. No. 3,373,330, and Hugenholtz U.S. Pat. No. 3,566,308.

SUMMARY OF THE INVENTION

An object of the present invention is to provide an improved a.c. control circuit.

Another object of this invention is to provide an a.c. control circuit responsive to a d.c. program reference source for producing sine wave programming drive signals with a frequency synchronous with a main a.c. power source frequency and insensitive to electrical variables other than the program reference variables.

The present improved a.c. control circuit comprises a chopper circuit having a d.c. input connected for wave amplitude response to a d.c. program reference voltage and a chopping drive signal circuit connected for response to the frequency of a main a.c. power source and having an output providing a square wave signal having a peak-to-peak amplitude in accordance with the d.c. program reference voltage and a frequency equal to the main a.c. power source frequency. This square wave chopper output is coupled to an input drive circuit of an active filter, which may include an operational amplifier sharply tuned to the frequency of the main a.c. source by a sharply tuned filter, such as a sharp twin-T notch filter, tuned to the main a.c. source frequency and connected in a negative feedback circuit for the operational amplifier to which the chopper output is coupled. This active filter provides a stable, drift-free sine wave output control voltage having a frequency synchronous with and in phase with the main a.c. power source frequency and a peak-to-peak amplitude directly responsive to the peak-to-peak amplitude of the chopper square wave output. The power supply to be controlled comprises a suitable emitter-follower amplifier having power inputs connected to outputs of a full-wave rectifier having inputs energized by the main a.c. power source. The base drive of the emitter-follower amplifier is coupled to the active filter programmed sine-wave control voltage output whereby the emitter-follower amplifier output is an a.c. voltage corresponding substantially to the programmed sine wave control voltage, independent of any main a.c. power line fluctuations and free from variable resistance effects as are so prevalent in FET's, light-dependent resistors, and analogue multipliers. It is readily programmed by a small d.c. reference voltage and its circuit is highly stable and drift free, with a minimum dissipation in the driving semiconductors, and requires transistors with voltage ratings only beyond the peak a.c. line value, not the peak-to-peak value.

Further objects and advantages of this invention will be apparent from the following description referring to the accompanying drawing, and the features of novelty which characterize this invention will be pointed out with particularity in the claims appended to and forming a part of this specification.

BRIEF DESCRIPTION OF THE DRAWING

In the drawing, the single FIGURE is a schematic illustration of an improved a.c. control circuit embodying the present invention wherein a small d.c. program reference voltage is utilized to provide a stable, drift free programmed a.c. power source control.

DETAILED DESCRIPTION OF INVENTION

Referring to the drawing, the FIGURE illustrates an improved a.c. control circuit according to the present invention which is particularly useful for controlling the torque or speed of an electric motor, for example, such as a spooling motor for recording film or magnetic tape drive. The output characteristic of the motor, such as its torque or speed, is determined by the requirements of the load driven by the motor, and various conventional measuring devices are available to provide a load sensed reference signal voltage dependent upon the tension, speed, or other desired load characteristic. Such a reference signal voltage may be a d.c. voltage having an amplitude which is responsive to a predetermined desired characteristic, which d.c. voltage is usable as the reference for programming the a.c. power control.

According to the present invention, such a d.c. program reference voltage is adapted to be impressed on the control circuit by connecting its program signal source 10 to the inputs 11 and 12 of a drive circuit of a suitable conventional d.c. operational amplifier 13, such as are disclosed in G. E. Transistor Manual, 7th ed. (1964), page 213. A large negative feedback circuit 14 is provided to provide for very stable operation. The d.c. reference signal is thus amplified and appears at the operational amplifier output 15.

In order to provide a control signal wave form free from power line fluctuations, the a.c. control signal amplitude is made dependent only directly on the amplitude of the d.c. program reference voltage. This is obtained by converting the d.c. program reference voltage into a square wave and then reshaping it into a sine wave having a peak-to-peak amplitude directly responsive to the d.c. program reference voltage and a frequency synchronous with and in phase with the main a.c. power source for the a.c. motor. This conversion of the amplified d.c. program reference voltage is obtained by connecting the amplifier 13 output 15 to the input of a suitable conventional chopper 16, such for example as those disclosed in the G. E. Transistor Manual, 7th ed. (1964), page 88 et seq., and having a chopper circuit energized by the secondary 17 of a conventional transformer 18. The primary 19 of the transformer is connected for energization by a suitable main a.c. power source 20 having a normal a.c. voltage sine wave form $a-b$. Thus the chopper 16 produces at its output 21 a programmed square wave signal voltage $d-e$ with a peak voltage value equal to the d.c. on its input from the amplifier output 15 and with a frequency equal to the main a.c. power source 20 frequency and 180° out of phase therewith.

This programmed square wave control signal $d-e$ is then converted into a true sine wave control signal having a frequency synchronous with and in phase with the main a.c. power source frequency, free of line fluctuations, with assured stability and freedom from drift and vibration resistance variations. In order thus to convert the square wave signal $d-e$, the chopper output 21 is coupled to an operational amplifier 22 through a suitable capacitor 23 in series with a resistor 24 connected to a negative feedback circuit for the amplifier 22. This feedback circuit includes a sharp band pass filter 25, preferably a twin-T notch filter, tuned sharply to the frequency of the main a.c. power source 20 and connected in parallel with capacitors 26 and 27. The filter also includes a suitable adjustable trim resistor 28 connected between the capacitors 26 and 27 to ground, and the square wave drive circuit is connected to the feedback filter circuit at 29, between the trim resistor 28 and the capacitors 26 and 27. This operational amplifier 22 circuitry with its sharp band pass action eliminates the harmonic content of the driving square wave $d-e$ and functions as an active filter producing at its output 30 a programmed sine wave control signal voltage $f-g$ having an amplitude directly responsive to the amplitude of the d.c. program reference signal source 10 initially impressed on the input to the d.c. operational amplifier 13 and having a frequency synchronous with and in phase with the main a.c. power source 20 frequency.

This programmed sine wave control signal voltage $f-g$ is utilized to control the load, such as a spooling motor (not shown), in accordance with the desired predetermined program represented by the d.c. program reference signal voltage 10. In order thus to provide a program controlled energization to the load, the main a.c. power source 20 is connected to inputs 31–32 of a suitable full-wave rectifier, such as a full-wave bridge rectifier 33, the outputs 34–35 of which are connected to emitter-follower power input terminals 36–37, respectively, of a suitable amplifier 38, such as a class B type quasi-complementary emitter-follower amplifier, driven by a control signal responsive to the programmed sine wave control signal $f-g$ from the active filter 22. Since in a conventional class B amplifier only one transistor leg conducts at a given time, the amplifier 38 functions, using the pulsating direct current from the rectifier 33, substantially as it would if pure direct current were available for that half cycle. It is required, therefore, that the emitter-follower system be driven by control signals which are properly phased with respect to the d.c. pulsations from the rectifier 33, the alternate conduction in the two legs of the amplifier 38 then providing a wave form at the amplifier output 39 which is substantially in accordance with the drive control signal supplied to the amplifier drive input 40.

According to the present invention, this amplifier drive control signal is provided by the active filter 22 output control voltage $f-g$ by coupling the filter output 30 to the amplifier drive input 40 through a suitable transformer 41. This coupling is provided by connecting the filter output 30 through a capacitor 42 to the primary winding 43 of the transformer 41, and the transformer has a secondary winding 44 connected across the amplifier drive input 40 and one side of the main a.c. power supply. In this manner, the programmed sine wave control signal $f-g$ is transmitted as a suitably stepped-up correspondingly programmed sine wave amplifier drive control signal $f'-g'$ to the amplifier drive input 40 by the transformer 41 in proper phased relation with respect to the rectifier pulses from the rectifier 33 to provide for the respective alternate conduction of the two transistor legs of the amplifier 38. The amplitude of the drive signal $f'-g'$ determines the amplitude of the output of each respective leg of the amplifier 38 so that the amplifier provides a programmed sine wave $a'-b'$ at its output 39 having a frequency synchronous with the main a.c. power frequency wave $a-b$ and with an amplitude programmed in accordance with the d.c. program reference signal from the source 10. A Zener diode 45 preferably is connected across the output terminals 34–35 of the rectifier 33 to protect the system against damage which might result from transients in the main a.c. power line and prevent transmittal of such transients to the amplifier 38.

While a particular embodiment of this invention has been illustrated and described, modifications thereof will occur to those skilled in the art. It is to be understood, therefore, that this invention is not to be limited to the exact details disclosed.

I claim:

1. An a.c. control circuit including
   means for producing sine wave programming drive signals insensitive to electrical variables other than predetermined program reference variables comprising
   means for connecting said sine wave drive signal producing means to a d.c. program reference source having a program reference control voltage for programming the voltage of said a.c. control circuit, a d.c. operational amplifier having an input energized by connection through said connecting means to said d.c. program reference source and an output to provide an amplified program reference control voltage and also connected to provide a large negative feedback to said operational amplifier, an a.c. frequency-reference transformer having a primary with an input connection for energization by a main a.c. power source and a secondary output, a chopper having a d.c. input connected to said operational amplifier output and a chopping drive signal circuit connected to said a.c. frequency-reference transformer output, said chopper having an output providing a square wave signal with a peak-to-peak amplitude in accordance with said d.c. operational amplifier output program-reference control voltage and a frequency equal to and 180° out of phase with the main a.c. power source frequency, a sharp twin-T notch filter tuned sharply to the frequency of the main a.c. power source, means including an operational amplifier active filter having a negative feedback connection and an input drive circuit coupled to said chopper output through said sharp notch filter connected in said negative feedback connection and having an output providing a stable and drift-free sine wave output control voltage having a frequency synchronous with and in phase with the main a.c. power source frequency and a peak-to-peak amplitude directly responsive to the peak-to-peak amplitude of said chopper square wave output; and a program controlled power supply comprising an unfiltered full-wave bridge rectifier having inputs connected across the main a.c. power source and having output terminals, a quasi-complementary emitter-follower amplifier having emitter-follower power inputs connected to said bridge rectifier output terminals, a drive control transformer having a primary and a secondary with said primary connected for energization by said operational amplifier active filter output whereby said secondary provides a drive control voltage programmed by said drive signal producing means, and said emitter follower amplifier having a amplifier drive input connected to said drive control transformer secondary and having a power output for connection to a load whereby said power output voltage has an a.c. voltage wave form corresponding substantially to the programmed drive control voltage from said control transformer secondary.

2. In an a.c. control circuit for producing sine wave programming drive signals insensitive to electrical variables other than predetermined program reference variables including an a.c. power source, a d.c. reference signal source having an amplitude responsive to a predetermined characteristic, means to program said a.c. power source by said d.c. reference signal source to develop a sine wave control signal having a frequency synchronous with and in phase with the a.c. power source frequency and an amplitude directly response to the amplitude of said d.c. reference signal source; the improvement comprising an unfiltered power supply having a full-wave bridge rectifier with inputs connected to said a.c. power source and having output terminals, an emitter-follower amplifier having power inputs connected to the output terminals of said bridge rectifier, transformer means having a primary winding energized by said sine wave control signal and a secondary winding connected to said a.c. power supply and said emitter-follower amplifier for providing a drive control voltage to said emitter-follower amplifier, and said emitter-follower amplifier having a power output for connection to a load, whereby the output voltage from said emitter-follower amplifier has an a.c. voltage corresponding substantially to the drive control voltage supplied by said transformer means.

3. The structure of claim 2 including transient protector means connected across the output terminals of said bridge rectifier.

4. An a.c. control circuit comprising a d.c. program reference source having a control voltage, an a.c. power source, a chopper having a d.c. input for wave amplitude response to the reference voltage of said d.c. program reference source and a chopping drive signal circuit and a chopper output, a first means for connecting said d.c. program reference source to said chopper d.c. input and a second means for connecting said a.c. power source to said chopping drive signal circuit, whereby said chopper output provides a square wave signal having a peak-to-peak amplitude in accordance with the d.c. program reference voltage and a frequency equal to the main a.c. power source frequency, an operational amplifier having an active filter means connected to said chopper output and tuned to the frequency of the a.c. power source so that said amplifier has an output providing a programmed sine wave control voltage with an amplitude directly responsive to the peak-to-peak amplitude of said chopper output and a frequency synchronous and in phase with the a.c. power source frequency, a full-wave bridge rectifier having inputs connected to said a.c. power source and having output terminals, an emitter-follower amplifier having power inputs connected to the output terminals of said bridge rectifier, transformer means having a primary winding energized by said sine wave control voltage and a secondary winding connected to said a.c. power source and an amplifier drive input of said emitter-follower amplifier for providing a drive control voltage to said emitter-follower amplifier, and said emitter-follower amplifier having a power output which is insensitive to electrical variables other than the predetermined program reference variables, whereby the output voltage from said emitter-follower amplifier has an a.c. voltage corresponding substantially to the driving control voltage supplied by said transformer means.

5. The a.c. control circuit of claim 4 in which said first means connecting said d.c. program reference signal source to said chopper d.c. input comprises a d.c. operational amplifier having an input energized by connection to said d.c. program reference signal source and an output connected to said chopper d.c. input for supplying an amplified program reference control voltage thereto.

6. An a.c. control circuit as defined in claim 5 in which said d.c. operational amplifier output is connected to provide a large negative feedback to said d.c. operational amplifier.

7. The a.c. control circuit of claim 4 in which said second means for connecting said main a.c. power source to said chopping drive signal circuit comprises a transformer having a primary energized by said a.c.

power source and a secondary connected to said chopping drive signal circuit.

8. An a.c. control circuit as defined in claim 4 in which said active filter means includes a negative feedback connection for said operational amplifier having a band pass filter sharply tuned to the frequency of the main a.c. power source and an input drive circuit coupled to said chopper output and an active filter output connected to the output of said operational amplifier.

* * * * *